United States Patent
Chen et al.

(10) Patent No.: US 10,672,130 B2
(45) Date of Patent: Jun. 2, 2020

(54) CO-SEGMENTATION METHOD AND APPARATUS FOR THREE-DIMENSIONAL MODEL SET

(71) Applicant: BEIHANG UNIVERSITY, Beijing (CN)

(72) Inventors: Xiaowu Chen, Beijing (CN); Dongqing Zou, Beijing (CN); Xiaogang Wang, Beijing (CN); Zongji Wang, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 109 days.

(21) Appl. No.: 15/892,347

(22) Filed: Feb. 8, 2018

(65) Prior Publication Data

US 2018/0240242 A1   Aug. 23, 2018

(30) Foreign Application Priority Data

Feb. 17, 2017   (CN) .......................... 2017 1 0088613

(51) Int. Cl.
  *G06T 7/174*   (2017.01)
  *G06T 7/11*   (2017.01)
  *G06T 7/162*   (2017.01)

(52) U.S. Cl.
  CPC ............... *G06T 7/174* (2017.01); *G06T 7/11* (2017.01); *G06T 7/162* (2017.01);
  (Continued)

(58) Field of Classification Search
  None
  See application file for complete search history.

(56) References Cited

U.S. PATENT DOCUMENTS 9,224,207 B2   12/2015   Vitaladevuni et al.
2010/0217417 A1*   8/2010   Zouhar ............... G06F 17/5009
                                                              700/98
(Continued)

FOREIGN PATENT DOCUMENTS

CN   103903245 A   7/2014
CN   105427252 A   3/2016
CN   106204749 A   12/2016

OTHER PUBLICATIONS

Zizhao Wu, Unsupervised co-segmentation of 3D shapes via affinity aggregation spectral clustering, 2013 (Year: 2013).*
(Continued)

*Primary Examiner* — Kevin Ky
(74) *Attorney, Agent, or Firm* — J.C. Patents (57) ABSTRACT

Disclosed is a co-segmentation method and apparatus for a three-dimensional model set, which includes: obtaining a super patch set for the three-dimensional model set which includes at least two three-dimensional models, each of the three-dimensional models including at least two super patches; obtaining a consistent affinity propagation model according to a first predefined condition and a conventional affinity propagation model, the consistent affinity propagation model being constraint by the first predefined condition which is position information for at least two super patches that are in the super patch set and belong to a common three-dimensional model set; converting the consistent affinity propagation model into a consistent convergence affinity propagation model; clustering the super patch set through the consistent convergence affinity propagation model to generate a co-segmentation outcome for the three-dimensional model set. The disclosed three-dimensional (Continued)

model set co-segmentation method and apparatus improves consistency between three-dimensional model set co-segmentation outcomes.

8 Claims, 7 Drawing Sheets

(52) U.S. Cl.
CPC ............... *G06T 2207/10024* (2013.01); *G06T 2207/10028* (2013.01); *G06T 2207/20072* (2013.01); *G06T 2207/20112* (2013.01)

(56) References Cited

U.S. PATENT DOCUMENTS

| | | | |
|---|---|---|---|
| 2010/0223299 A1* | 9/2010 | Yun | G06F 16/532 707/803 |
| 2010/0232686 A1* | 9/2010 | Dewan | G06K 9/6209 382/159 |
| 2015/0081797 A1* | 3/2015 | Ogawa | G06Q 50/01 709/205 |
| 2015/0146939 A1* | 5/2015 | Datta | A01K 67/00 382/110 |

OTHER PUBLICATIONS

Wu, Zizhao et al., "Unsupervised co-segmentation of 3D shapes via affinity aggregation spectral clustering" Computer & Graphics, vol. 37, (2013), pp. 628-637.
The Chinese First Examination Report of corresponding Chinese application No. 201710088613.9, dated Mar. 25, 2019.

* cited by examiner

CO-SEGMENTATION METHOD AND APPARATUS FOR THREE-DIMENSIONAL MODEL SET

CROSS-REFERENCE TO RELATED APPLICATION

This application claims priority to Chinese Patent Application No. 201710088613.9, filed on Feb. 17, 2017, which is hereby incorporated by reference in its entirety.

TECHNICAL FIELD

The present disclosure relates to the field of computer graphics technology, and particularly to a co-segmentation method and apparatus for a three-dimensional model set.

BACKGROUND

In the field of computer graphics technology, co-segmentation for a three-dimensional model set plays a significant role in joint analysis for the three-dimensional model set.

In the prior art, a three-dimensional model set is typically co-segmented by a cluster analysis for super patches in the three-dimensional model set using a conventional affinity propagation (AP) model. However, the cluster analysis for a three-dimensional model set using the conventional affinity propagation model does not consider any position relation information between neighboring super patches, causing inconsistency between three-dimensional model set co-segmentation outcomes.

Thus, consistency is low for three-dimensional model set co-segmentation outcomes using the prior art.

SUMMARY

The present disclosure provides a co-segmentation method and apparatus for a three-dimensional model set to improve consistency between three-dimensional model set co-segmentation outcomes.

A disclosed embodiment provides a co-segmentation method for a three-dimensional model set, including:

obtaining a super patch set for the three-dimensional model set, where the three-dimensional model set includes at least two three-dimensional models, and each of the three-dimensional models includes at least two super patches;

obtaining a consistent affinity propagation model according to a first predefined condition and a conventional affinity propagation model, where the consistent affinity propagation model is constraint by the first predefined condition, and the first predefined condition is position information between at least two super patches that are in the super patch set and belong to a common three-dimensional model set;

converting the consistent affinity propagation model into a consistent convergence affinity propagation model; and clustering the super patch set through the consistent convergence affinity propagation model to generate a co-segmentation outcome for the three-dimensional model set.

In a disclosed embodiment, the obtaining a consistent affinity propagation model according to a first predefined condition and a conventional affinity propagation model includes:

constructing a factor graph according to the conventional affinity propagation model and the first predefined condition; and obtaining the consistent affinity propagation model according to the factor graph, so that a sum of affinity between a super patch and a cluster center thereof is minimized for at least two super patches in each three-dimensional model set, where the super patch set includes at least two cluster centers, and each super patch in the super patch set belongs to the same cluster center.

In a disclosed embodiment, the converting the consistent affinity propagation model into a consistent convergence affinity propagation model includes:

pre-establishing a second predefined condition and a third predefined condition, where the second predefined condition is a first position relation between any two super patches in the super patch set, and the third predefined condition is a second position relation between at least two super patches that are in the super patch set and belong to different three-dimensional models; and obtaining the consistent convergence affinity propagation model according to the second predefined condition, the third predefined condition and the consistent affinity propagation model, where the consistent convergence affinity propagation model is constraint by the second predefined condition and the third predefined condition.

In a disclosed embodiment, the pre-establishing a second predefined condition includes:

extracting a robust feature vector from a feature vector associated with the super patch set;

establishing a first association relation between two robust feature vectors that belong to the different three-dimensional models according to a feature descriptor associated with the robust feature vector, where the feature descriptor is used for identifying the robust feature vector;

establishing a second association relation between at least two super patches in the super patch set and belong to different three-dimensional models; and establishing the first position relation according to the second association relation.

In a disclosed embodiment, before the extracting a robust feature vector from a feature vector associated with the super patch set, the method further includes:

extracting at least seven feature vectors from each super patch in the super patch set;

determining a weight for each feature vector in the at least seven feature vectors; and multiplying each feature vector in the at least seven feature vectors with a weight associated with the feature vector, and undergoing a normalization process to obtain a unique feature vector associated with each super patch, where the unique feature vectors associated with the super patches form a feature vector set associated with the super patch set.

In a disclosed embodiment, the obtaining the consistent convergence affinity propagation model according to the second predefined condition, the third predefined condition and the consistent affinity propagation model includes:

obtaining the consistent convergence affinity propagation model according to $$S(c_i, c_j) = -\sum_{i \in \pi} s(i, c_i) + \frac{1}{2}\sum_{i \in \pi}\sum_{j \in \pi} \Gamma_{i,j}(c_i, c_j),$$

where $\pi$ represents the super patch set, $S(c_i,c_j)$ represents an optimization outcome for the super patch set based on the consistent convergence affinity propagation model, $s(i,c_i)$ represents an affinity between a super patch i in the super patch set and a cluster center C, to which the super patch belongs, $\Gamma_{i,j}(c_i,c_j)$ is a constraint item that represents a relation between a super patch i, a super patch j and the cluster center $c_i$, $$\Gamma_{i,j}(c_i, c_j) = \begin{cases} \infty, \text{ if } c_i = j, c_j \neq i \\ \infty, \text{ if } c_j = i, c_j \neq i \\ e^{-s(i,j)}, j \in N_e(i), c_i \neq c_j \\ 0, \text{ otherwise} \end{cases},$$

$c_j$ represents the cluster center for the super patch j, and $e^{-s(i,j)}$ represents an affinity between the super patch i and the super patch j.

In a disclosed embodiment, the obtaining the consistent affinity propagation model according to the factor graph includes:

obtaining the consistent affinity propagation model according to $$S(x_{11}, \ldots, x_{NN}) = \sum_{i=1}^{N} \sum_{c=1}^{N} S_{ic}(x_{ic}) + \sum_i I_{i=1}(x_{i1}, \ldots, x_{iN}) + \sum_c E_{c=1}(x_{1c}, \ldots, x_{Nc}) + \sum_{\{i,k\} \in N_c} \frac{\lambda_{iC}}{2} \sum_{c=1}^{N} P_{ikc}(x_{ic}, x_{kc});$$

where $S(x_{11}, \ldots, x_{NN})$ represents an energy function for the cluster center of the super patch, $S_{iC}(x_{iC})$ represents an affinity between a super patch i and a potential cluster center c for the super patch, $$S_{ic}(x_{ic}) = \begin{cases} s(i, c), \text{ if } x_{ic} = 1 \\ 0, \text{ otherwise} \end{cases},$$

$x_{ic}=1$ represents the super patch i and the cluster center thereof c, $I_i(x_{i1}, \ldots, x_{iN})$ represents a N constraint over the cluster center $c_i$ for the super patch i, $$I_i(x_{i1}, \ldots, x_{iN}) = \begin{cases} \infty, \sum_c x_{ic} \neq 1 \\ 0, \text{ otherwise} \end{cases},$$

$E_c(x_{1c}, \ldots, x_{Nc})$ represents a validity constraint over the cluster center c, $$E_c(x_{1c}, \ldots, x_{Nc}) = \begin{cases} \infty, \text{ if } x_{cc} = 0 \text{ and } \sum_i x_{ic} \neq 0 \\ 0, \text{ otherwise} \end{cases},$$

and $P_{ikc}(x_{ic}, x_{kc})$ represents a neighborhood consistency constraint, $$P_{ikc}(x_{ic}, x_{kc}) = \begin{cases} 0, \text{ if } x_{ic} = x_{kc} \\ e^{-s(i,c)}, \text{ otherwise} \end{cases}.$$

A disclosed embodiment further provides a co-segmentation apparatus for a three-dimensional model set, including:

an obtaining module, configured to obtain a super patch set for the three-dimensional model set, where the three-dimensional model set includes at least two three-dimensional models, and each of the three-dimensional models includes at least two super patches;

the obtaining module is further configured to obtain a consistent affinity propagation model according to a first predefined condition and a conventional affinity propagation model, where the consistent affinity propagation model is constraint by the first predefined condition, and the first predefined condition is position information between at least two super patches that are in the super patch set and belong to a common three-dimensional model set;

a converting module, configured to convert the consistent affinity propagation model into a consistent convergence affinity propagation model; and a generating module, configured to cluster the super patch set through the consistent convergence affinity propagation model to generate a co-segmentation outcome for the three-dimensional model set.

In a disclosed embodiment, the obtaining module is configured to construct a factor graph according to the conventional affinity propagation model and the first predefined condition; and obtain the consistent affinity propagation model according to the factor graph, so that a sum of affinity between a super patch and a cluster center thereof is minimized for at least two super patches in each three-dimensional model set, where the super patch set includes at least two cluster center, and each super patch in the super patch set belongs to the same cluster center.

In a disclosed embodiment, the converting module is configured to pre-establish a second predefined condition and a third predefined condition, where the second predefined condition is a first position relation between any two super patches in the super patch set, and the third predefined condition is a second position relation between at least two super patches that are in the super patch set and belong to different three-dimensional models; and obtain the consistent convergence affinity propagation model according to the second predefined condition, the third predefined condition and the consistent affinity propagation model, where the consistent convergence affinity propagation model is constraint by the second predefined condition and the third predefined condition.

Disclosed embodiments provide a co-segmentation method and apparatus for a three-dimensional model set which obtain a super patch set for the three-dimensional model set, the three-dimensional model set includes at least two three-dimensional models, and each of the three-dimensional models includes at least two super patches; obtain a consistent affinity propagation model according to a first predefined condition and a conventional affinity propagation model, where the consistent affinity propagation model is constraint by the first predefined condition, and the predefined condition is position information between at least two super patches that are in the super patch set and belong to a common three-dimensional model set; convert the consistent affinity propagation model into a consistent convergence affinity propagation model; and cluster the super patch set through the consistent convergence affinity propagation model to generate a co-segmentation outcome for the three-dimensional model set. Thus, consistency is improved between three-dimensional model set co-segmentation outcomes.

BRIEF DESCRIPTION OF DRAWINGS

Technical solutions of the embodiments of the disclosure are described clearly and completely in conjunction with the accompanying drawings as follows. Apparently, the described drawings are merely a part of but not all of the embodiments according to the disclosure. Based on the described drawings of the disclosure, other drawings can be obtained by those of ordinary skill in the art without any creative work.

DESCRIPTION OF EMBODIMENTS

The technical solutions of the embodiments of the disclosure are described clearly and completely in conjunction with the accompanying drawings as follows. Apparently, the described drawings are merely a part of but not all of the embodiments according to the disclosure. Any and all other embodiments obtained by persons of ordinary skill in the art based on the presently disclosed embodiments without making any creative effort shall fall into the protection scope of the present disclosure.

The terms "first", "second", "third", "fourth" or the like (if any), whether in the description, claims or the figures, are used for distinguishing similar objects, rather than for describing any particular sequence or order. It should be understood that any numeral used as such are interchangeable whenever appropriate in order to help describing the disclosed embodiments, e.g., to demonstrate a potential in being implemented in orders other than those depicted or described. Moreover, the terms "include", "have" and any variation thereof are intended to cover a non-exclusive inclusion, e.g., a process, method, system, product or device may include, but not necessarily limited to, those steps or units explicitly described. Instead, the process, method, system, product or device may include any other steps or units that are, although not clearly listed, inherent thereto.

It should be noted that the particular embodiments may be recombined, and same or similar concepts or processes might not be repeated in some embodiments.

Figure 1:
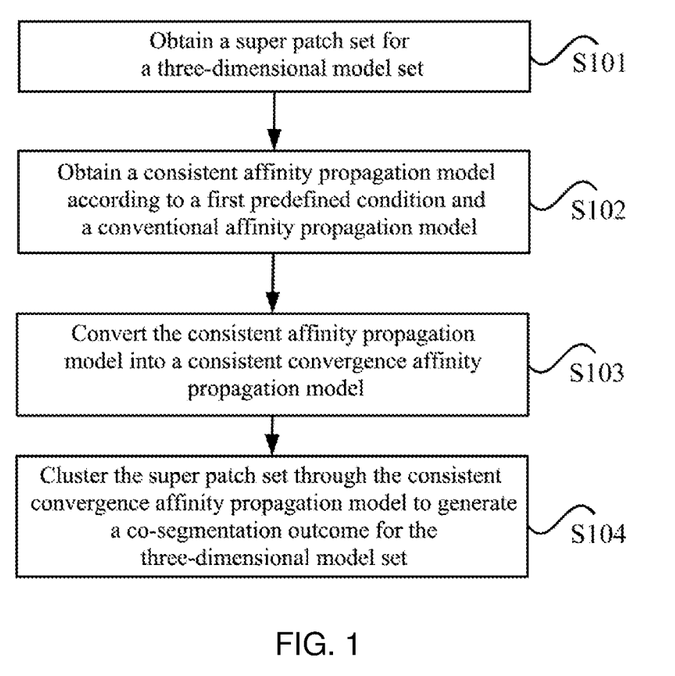
FIG. 1 is a flowchart illustrating a co-segmentation method for a three-dimensional model set according to a disclosed embodiment.

FIG. 1 is a flowchart illustrating a co-segmentation method for a three-dimensional model set according to a disclosed embodiment. The co-segmentation method for the three-dimensional model set may be executed by a co-segmentation apparatus for a three-dimensional model set. Illustratively, the co-segmentation apparatus for three-dimensional model set may be provided separately or integrated into a processor. Reference is now made to FIG. 1. Of course, disclosed embodiments are merely being explained using FIG. 1 as an illustration, rather than being limited thereto. The three-dimensional model set co-segmentation method may include:

S101: obtaining a super patch set for the three-dimensional model set.

Where, the three-dimensional model set includes at least two three-dimensional models, and each of the three-dimensional models includes at least two super patches. Illustratively, it is possible to over-segment each three-dimensional model in the three-dimensional model set to obtain at least two super patches for each three-dimensional model, and super patches associated with each of the three-dimensional models may form a super patch set for the three-dimensional model set.

In the disclosed embodiment, over-segmentation is performed for each three-dimensional model in the three-dimensional model set because: a three-dimensional model set is disadvantageous in its massive data amount and processing time, and time can be saved by dividing each three-dimensional model in the three-dimensional model set into smaller super patches and treating individual super patches as elements. Meanwhile, the number of segments may be varied according to the complexity of the three-dimensional models, including the number of the super patches and the semantic components. Particularly, for each three-dimensional model in the three-dimensional model set, N-cuts algorithm may be employed, in conjuncture with the complexity of the three-dimensional model, to determine the number of the super patches for the three-dimensional model, thus co-segmenting the three-dimensional model to create a super patch set for the three-dimensional model.

S102: obtain a consistent affinity propagation model according to a first predefined condition and a conventional affinity propagation model.

Where, the consistent affinity propagation model is constraint by the first predefined condition which is position information for at least two super patches that are in the super patch set and belong to a common three-dimensional model set. Illustratively, in the disclosed embodiment, the position information may be distance information. After the distance information is obtained for at least two super patches that belong to a common three-dimensional model set, the consistent affinity propagation model may be obtained according to the distance information for the at least two super patches that belong to the common three-dimensional model set and the conventional affinity propagation model.

S103: convert the consistent affinity propagation model into a consistent convergence affinity propagation model.

Illustratively, an equivalent transformation may be leveraged to convert the consistent affinity propagation model into the consistent convergence affinity propagation model.

Unfortunately, the min-sum circular belief propagation algorithm, which is typically used in solving the energy function, cannot guarantee convergence, and may consume considerable amount of time. What is worse, the energy function is, being a higher order function, difficult to be optimized through α-expansion algorithm. Thus, by way of the equivalent transformation, the consistent affinity propagation model may be converted into the consistent convergence affinity propagation model, so that the solution can be made using the α-expansion algorithm.

S104: cluster the super patch set through the consistent convergence affinity propagation model to generate a co-segmentation outcome for the three-dimensional model set.

The disclosed embodiment provides a co-segmentation method for a three-dimensional model set which obtain a super patch set for the three-dimensional model set which includes at least two three-dimensional models, each of the three-dimensional models including at least two super patches; obtain a consistent affinity propagation model according to a first predefined condition and a conventional affinity propagation model, the consistent affinity propagation model being constraint by the first predefined condition which is position information for at least two super patches that are in the super patch set and belong to a common three-dimensional model set; convert the consistent affinity propagation model into a consistent convergence affinity propagation model; and cluster the super patch set through the consistent convergence affinity propagation model to generate a co-segmentation outcome for the three-dimensional model set. Thus, consistency is improved between three-dimensional model set co-segmentation outcomes.

Figure 2:
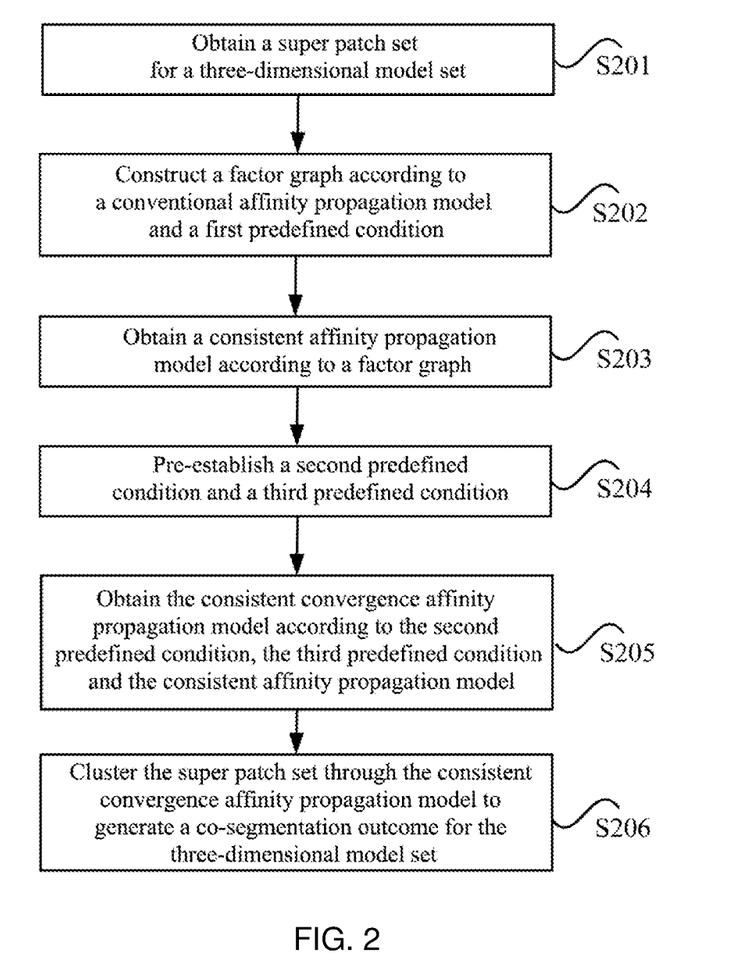
FIG. 2 is a flowchart illustrating another co-segmentation method for a three-dimensional model set according to a further disclosed embodiment.

On the basis of the embodiment illustrated in FIG. 1, reference is further made to FIG. 2, which is a flowchart illustrating another co-segmentation method for a three-dimensional model set according to a further disclosed embodiment. The three-dimensional model set co-segmentation method may further include:

S201: obtain a super patch set for the three-dimensional model set.

Where, the super patch set may be obtained in ways as recorded in the aforementioned S101, which will not be repeated herein.

S202: construct a factor graph according to the conventional affinity propagation model and the first predefined condition.

S203: obtain the consistent affinity propagation model according to the factor graph.

Where, the obtaining the consistent affinity propagation model according to the factor graph is intended to: minimize the sum of affinity between a super patch and a cluster center thereof for at least two super patches in each three-dimensional model set, where the super patch set includes at least two cluster center, and each super patch in the super patch set belongs to the same cluster center.

Figure 3:
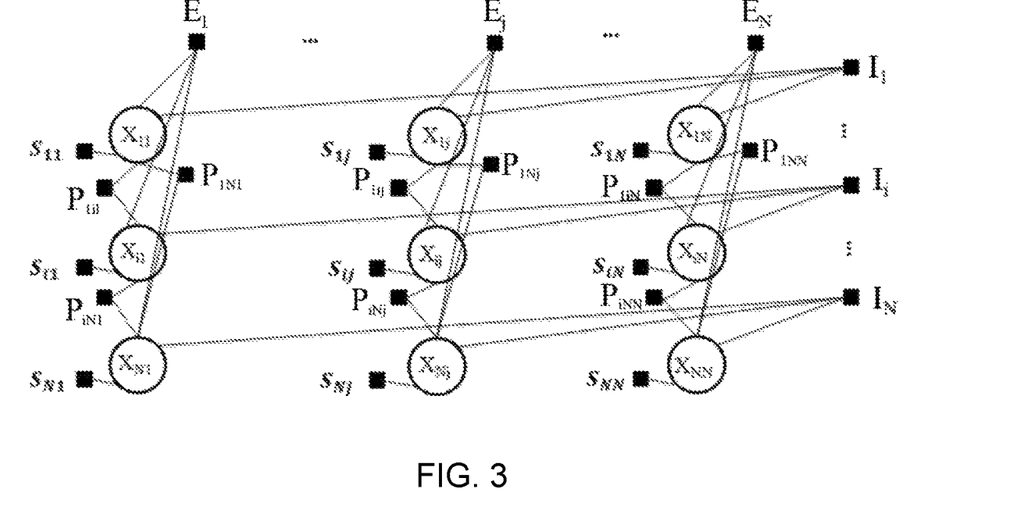
FIG. 3 is a principle diagram illustrating a consistent affinity propagation model according to a disclosed embodiment.

Reference is now made to FIG. 3, which is a principle diagram illustrating a consistent affinity propagation model according to a disclosed embodiment. Assuming $\{x_{iC}\}_{C=1}^{N}$ is a binary variable for a number of N super patches, and represents a one-to-N constraint with the cluster center $c_i$, i.e., for any $k \neq c(c \in \pi, k \in \pi)$, $c_i = c$ when and only when $x_{iC} = 1$ and $x_{ik} = 0$. Optionally, in the disclosed embodiment, the S203, i.e., obtaining the consistent affinity propagation model according to the factor graph, includes:

obtaining a consistent affinity propagation model according to $$S(x_{11}, \ldots, x_{NN}) = \sum_{i=1}^{N} \sum_{c=1}^{N} S_{ic}(x_{ic}) + \sum_{i} I_{i=1}(x_{i1}, \ldots, x_{iN}) + \sum_{c} E_{c=1}(x_{1c}, \ldots, x_{Nc}) + \sum_{\{i,k\} \in N_e} \frac{\lambda_{iC}}{2} \sum_{c=1}^{N} P_{ikc}(x_{ic}, x_{kc});$$

where, $S(x_{11}, \ldots, x_{NN})$ represents an energy function for a cluster center of the super patch, $S_{iC}(x_{iC})$ represents an affinity between a super patch i and a potential cluster center c for the super patch, $$S_{ic}(x_{ic}) = \begin{cases} s(i, c), & \text{if } x_{ic} = 1 \\ 0, & \text{otherwise} \end{cases},$$

$x_{ic}=1$ represents the super patch i and the cluster center thereof is c, $I_i(x_{i1}, \ldots, x_{iN})$ represents a N constraint over the cluster center $c_i$ for the super patch i, $$I_i(x_{i1}, \ldots, x_{iN}) = \begin{cases} \infty, & \sum_c x_{ic} \neq 1 \\ 0, & \text{otherwise} \end{cases},$$

$E_c(x_{1c}, \ldots, x_{Nc})$ represents a validity constraint over the cluster center $$E_c(x_{1c}, \ldots, x_{Nc}) = \begin{cases} \infty, & \text{if } x_{cc} = 0 \text{ and } \sum_i x_{ic} \neq 0 \\ 0, & \text{otherwise} \end{cases},$$

and $P_{ikc}(x_{ic}, x_{kc})$ represents a neighborhood consistency constraint, $$P_{ikc}(x_{ic}, x_{kc}) = \begin{cases} 0, & \text{if } x_{ic} = x_{kc} \\ e^{-s(i,c)}, & \text{otherwise} \end{cases}.$$

S204: pre-establish a second predefined condition and a third predefined condition.

Where, the second predefined condition is a first position relation between any two super patches in the super patch set, and the third predefined condition is a second position relation between at least two super patches in the super patch set and belongs to different three-dimensional models.

Optionally, in a disclosed embodiment, the establishing a second predefined condition includes:

extracting a robust feature vector from a feature vector associated with the super patch set; establishing a first association relation between two robust feature vectors that belong to the different three-dimensional models according to a feature descriptor associated with the robust feature vector; the feature descriptor being used for identifying the robust feature vector; establishing a second association relation between at least two super patches in the super patch set and belong to different three-dimensional models; and establishing the first position relation according to the second association relation.

Illustratively, in the disclosed embodiment, the extracting a robust feature vector from a feature vector associated with the super patch set and establishing a first association relation between two robust feature vectors that belong to the different three-dimensional models are primarily intended to allow for optimizing the final clustering outcome using distance between the clusters of the super patches of the three-dimensional model as a constraint. Additionally, considering the significant difference between the geometrical topologies of individual pairs of models in a three-dimensional model set, it will be undesirable to establish the first association relation upfront because a faulty association relation in the first association relation could lead to faulty co-segmentation outcome. Hence, a robust feature vector needs to be automatically extracted for each three-dimensional model in the three-dimensional model set before matching the feature vectors between the three-dimensional models to identify association relation between characteristic points that are sparse but reliable. Eventually, the feature vector would correspond to such sparse but reliable association relation between the super patches.

Further, before the extracting a robust feature vector from a feature vector associated with the super patch set, further includes:

extracting at least seven feature vectors from each super patch in the super patch set; determining a weight for each feature vector in the at least seven feature vectors; and multiplying each feature vector in the at least seven feature vectors with a weight associated with the feature vector, and undergoing a normalization process to obtain a unique feature vector associated with each super patch, the unique feature vectors associated with the super patches forming a feature vector set associated with the super patch set.

Illustratively, in the disclosed embodiment, a small number of feature vectors may be extracted for each super patch to create a super patch feature descriptor, where the descriptor is substantially point at for describing the features for each super patch in the super patch set generated for each three-dimensional model. Particularly, at least seven feature vectors may be extracted from each super patch. Then, a histogram may be calculated for each type of feature descriptor of all triangular patches in the super patch to measure the differences. Join the seven feature vectors in each triangular patch into one feature vector, obtain an average for all feature vectors of all triangular patches in the super patch, and perform a normalization process. The final outcome will be taken as the feature descriptor for the super patch.

S205: obtain the consistent convergence affinity propagation model according to the second predefined condition, the third predefined condition and the consistent affinity propagation model.

Where, the consistent convergence affinity propagation model is constraint by the second and the third predefined conditions.

Optionally, the S205 "obtain the consistent convergence affinity propagation model according to the second predefined condition, the third predefined condition and the consistent affinity propagation model" may further include:

obtaining the consistent convergence affinity propagation model according to $$S(c_i, c_j) = -\sum_{i \in \pi} s(i, c_i) + \frac{1}{2} \sum_{i \in \pi} \sum_{j \in \pi} \Gamma_{i,j}(c_i, c_j);$$

where $\pi$ represents the super patch set, $S(c_i, c_j)$ represents an optimization outcome for the super patch set based on the consistent convergence affinity propagation model, $s(i, c_i)$ represents an affinity between a super patch i in the super patch set and a cluster center $c_i$ to which the super patch belongs, $\Gamma_{i,j}(c_i, c_j)$ is a constraint item that represents a relation between a super patch i, a super patch j and the cluster center $c_i$, $$\Gamma_{i,j}(c_i, c_j) = \begin{cases} \infty, & \text{if } c_i = j, c_j \neq i \\ \infty, & \text{if } c_j = i, c_j \neq i \\ e^{-s(i,j)}, & j \in N_e(i), c_i \neq c_j \\ 0, & \text{otherwise} \end{cases},$$

$c_j$ represents the cluster center for the super patch j, and $e^{-s(i,j)}$ represents an affinity between the super patch i and the super patch j.

Illustratively, an equivalent transformation may be leveraged to convert the consistent affinity propagation model into the consistent convergence affinity propagation model. Unfortunately, the min-sum circular belief propagation algorithm, which is typically used in solving the energy function, cannot guarantee convergence, and may consume considerable amount of time. What is worse, the energy function is, being a higher order function, difficult to be optimized through α-expansion algorithm. Thus, by way of the equivalent transformation, the consistent affinity propagation model may be converted into the consistent convergence affinity propagation model, so that the solution can be made using the α-expansion algorithm.

S206: cluster the super patch set through the consistent convergence affinity propagation model to generate a co-segmentation outcome for the three-dimensional model set.

By clustering the super patch set of a three-dimensional model through the cluster-optimized consistent convergence affinity propagation model, a co-segmentation outcome is generated for the three-dimensional model set. Particularly, by embedding the consistent convergence affinity propagation algorithm with association relations between the models, associated super patch can be categorized into the same class, and the clustering outcome can be optimized by restricting distances between the subsets. Then, α-expansion algorithm is leveraged to minimize the energy for the energy function, generating the final co-segmentation outcome for the three-dimensional model set. As can be seen, the disclosed embodiments embed local spatial consistency information into a conventional affinity propagation model to transform the conventional affinity propagation model into a consistent convergence affinity propagation model, while embedding the consistent convergence affinity propagation algorithm with association relations between the models, so that associated super patch can be categorized into the same class, and the clustering outcome can be optimized by restricting distances between the subsets. Then, α-expansion algorithm is leveraged to minimize the energy for the energy function and generate the final co-segmentation outcome for the three-dimensional model set, thereby improving consistency between three-dimensional model set co-segmentation outcomes.

Figure 4:
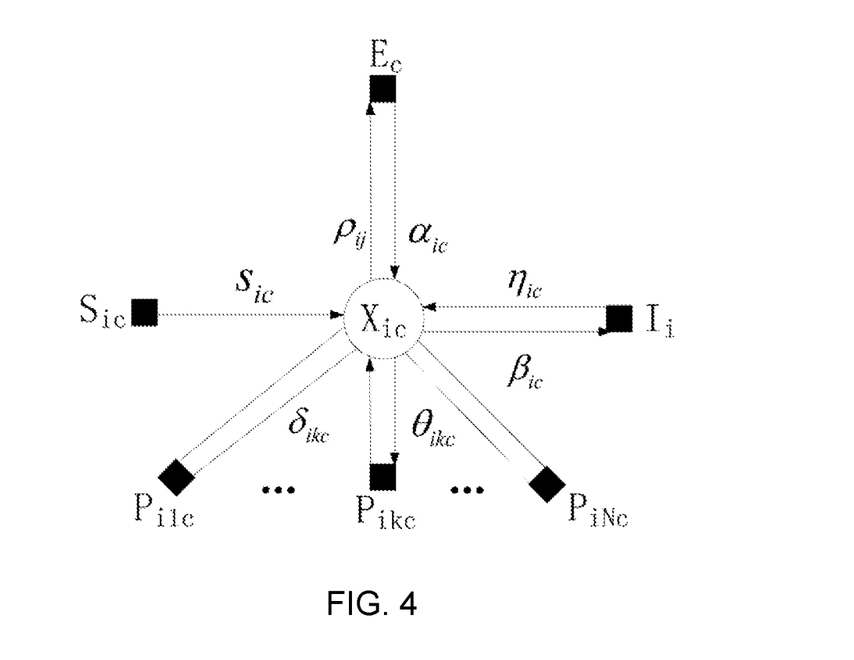
FIG. 4 is a schematic diagram illustrating message updating for a consistent affinity propagation model according to a disclosed embodiment.

Further, a message updating mechanism may further be employed to propagate throughout a factor graph iteratively, until the sum of affinities between all super patches and their cluster centers reaches the minimum. Reference is now made to FIG. 4, which is a schematic diagram illustrating message updating for a consistent affinity propagation model according to a disclosed embodiment. In co-segmenting a three-dimensional model, the co-segmentation can be transformed to acquiring an optimal cluster center for a super patch set of a three-dimensional model. Assuming that a three-dimensional model set $\{M_i\}_{i=1}^n$ leads to an all super facet set $\{i \in \pi\}_{i=1}^N$, with an eye to obtain a preferred cluster center, two types of message mechanisms, i.e., "availability" to $\{\rho_{ic}, \beta_{ic}, \theta_{ikc} | i \in \pi, c \in \pi\}$ and "responsiveness" $\{\alpha_{ic}, \eta_{ic}, \delta_{ikc} | i \in \pi, c \in \pi\}$, are defined to propagate iteratively, until the sum of affinities between all super patches and their cluster centers reaches minimum. Let $s_{ic}$ represent S(i,c), and sending a message from a variable node to a function node is defined as:

$$\rho_{ic} = s_{ic} - \min_{k \neq c}\left(s_{ic} + \alpha_{ik} + \sum_{k \in N_e(i)} \delta_{ikc}\right) + \sum_{k \in N_e(i)} \delta_{ikc};$$

$$\beta_{ic} = s_{ic} + \alpha_{ic} + \sum_{k \in N_e(i)} \delta_{ikc};$$

$$\theta_{ikc} = s_{ic} + \alpha_{ic} + \eta_{ic} + \sum_{q \in N_e(i) \& q \neq k} \delta_{iqc};$$

while a message feedback from the function node to the variable node is defined as:

$$\alpha_{ic} = \begin{cases} \sum_{k \neq c} \min(0, \rho kc), & \text{if } i = c \\ \max\left(0, \rho_{cc} + \sum_{k \neq \{i,c\}} \min(0, \rho_{kc})\right), & \text{otherwise} \end{cases};$$

$$\eta_{ic} = -\min_{k \neq c} \beta_{ik};$$

$$\delta_{ikc} = \begin{cases} s_{ik}, s_{ik}, , \theta_{ikc} \\ \theta_{ikc}, -s_{ik}, , \theta_{ikc}, , s_{ik} \\ -s_{ik}, \theta_{ikc}, , -s_{ik} \end{cases};$$

Where both types of messages are transferred via the factor graph of the consistent affinity propagation model until convergence is reached, which allows for obtaining the nearest cluster center for each super patch.

Figure 5A:
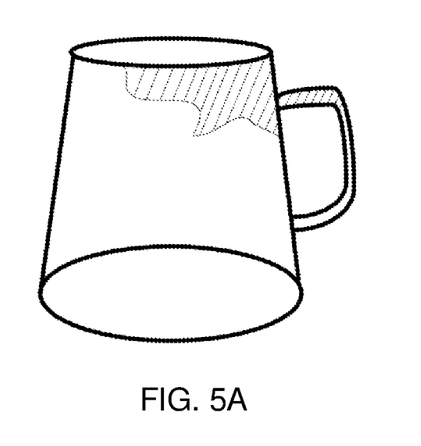
FIG. 5a is a schematic diagram illustrating a co-segmentation outcome for a cup using a consistent affinity propagation model according to a disclosed embodiment.
Figure 5B:
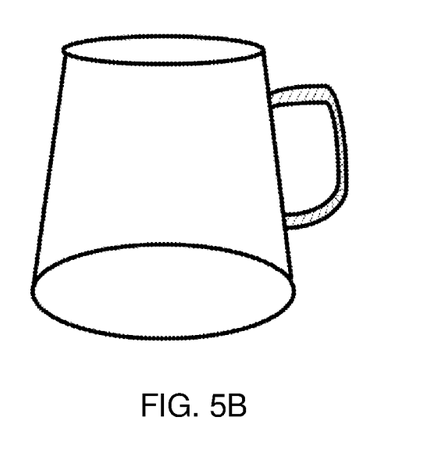
FIG. 5b is a schematic diagram illustrating a co-segmentation outcome for a cup using a consistent convergence affinity propagation model according to a disclosed embodiment.

Illustratively, reference is now made to FIGS. 5a and 5b, where FIG. 5a is a schematic diagram illustrating a co-segmentation outcome for a cup using a consistent affinity propagation model according to a disclosed embodiment, and FIG. 5b is a schematic diagram illustrating a co-segmentation outcome for a cup using a consistent convergence affinity propagation model according to a disclosed embodiment. It can be seen that, when the cup is being co-segmented, the cup body and handler portions of the cup as shown in FIG. 5a are of the same color (see the shadowed portion), while other portions are of another color (see the blank portion). By leveraging a consistent convergence affinity propagation model, this disclosure is capable of converting an energy function into an equivalent form, and then solve the problem by introducing an α-expansion algorithm, so that the cup as shown in FIG. 5b has a cup body colored (see the blank portion) differently from the color of the handler (see the shadowed portion), thereby producing an improved co-segmentation outcome. By comparison, it can be clearly seen that the consistent convergence affinity propagation model can lead to a more desirable co-segmentation outcome.

Figure 6A:
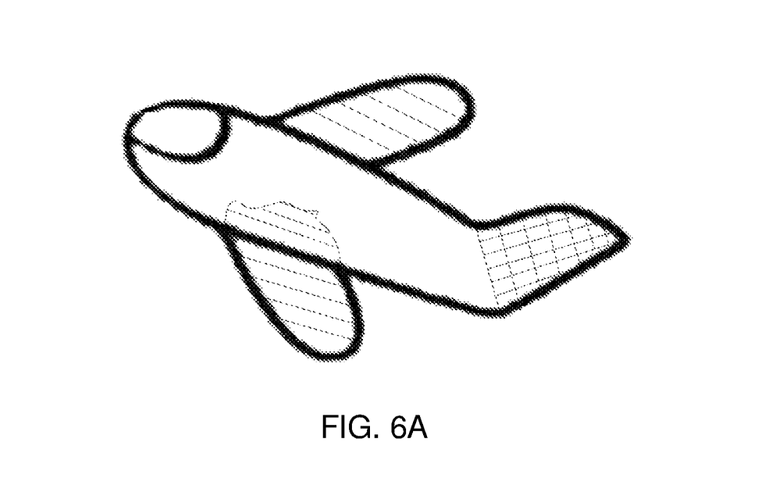
FIG. 6a is a schematic diagram illustrating a co-segmentation outcome for an aircraft using a consistent convergence affinity propagation model according to a disclosed embodiment.
Figure 6B:
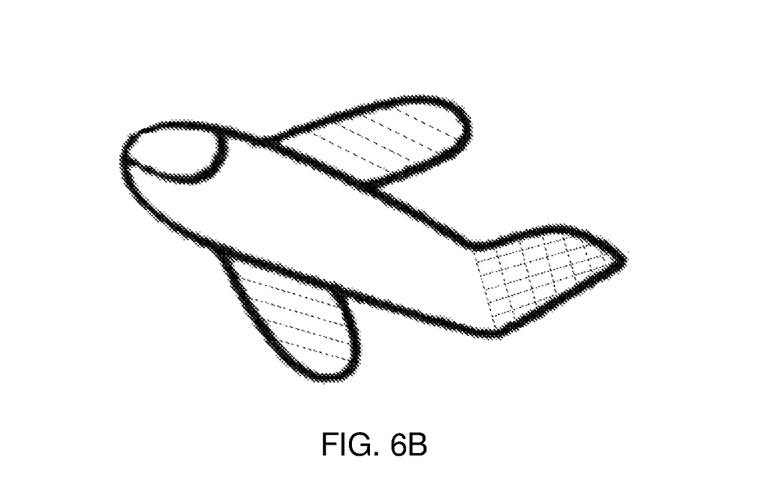
FIG. 6b is a schematic diagram illustrating a co-segmentation outcome for an aircraft using a cluster-optimized consistent convergence affinity propagation model according to a disclosed embodiment.

Illustratively, reference is now made to FIGS. 6a and 6b, where FIG. 6a is a schematic diagram illustrating a co-segmentation outcome for an aircraft using a consistent convergence affinity propagation model according to a disclosed embodiment, and FIG. 6b is a schematic diagram illustrating a co-segmentation outcome for an aircraft using a cluster-optimized consistent convergence affinity propagation model according to a disclosed embodiment. It can be seen that, when the aircraft is being co-segmented, part of the fuselage and the wings of the aircraft as shown in FIG. 6a are of the same color (see the shadowed portion), while other portions are of another color (see the blank portion). This disclosure augments a cluster-optimized consistent convergence affinity propagation model by adding as constraint a sparse association relation, which is of a small number but robust nature, between the three-dimensional models, so that the aircraft as shown in FIG. 6b has a fuselage of the same color (see the blank portion) and a tail of the same color (see the grid portion), thereby producing an improved co-segmentation outcome. By comparison, it can be clearly seen that adding the robust and sparse intra-three-dimensional model association relation can lead to a more desirable co-segmentation outcome.

Figure 7:
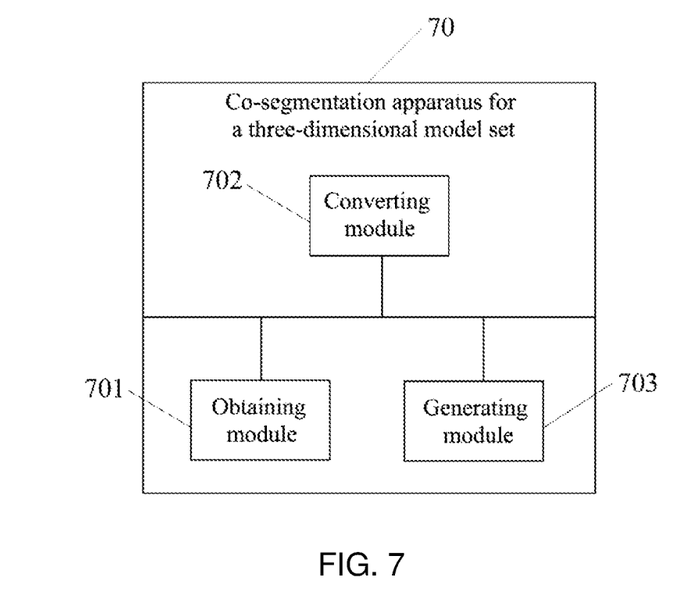
FIG. 7 is a schematic structural diagram illustrating a co-segmentation apparatus for a three-dimensional model set according to a disclosed embodiment.

FIG. 7 is a schematic structural diagram illustrating a co-segmentation apparatus 70 for a three-dimensional model set according to a disclosed embodiment. Of course, the disclosed embodiment is merely being explained using FIG. 7 as an illustration, rather than being limited thereto. As depicted in FIG. 7, the three-dimensional model set co-segmentation apparatus 70 may include:

an obtaining module 701, configured to obtain a super patch set for the three-dimensional model set which includes at least two three-dimensional models, each of the three-dimensional models including at least two super patches;

the obtaining module 701 is further configured to obtain a consistent affinity propagation model according to a first predefined condition and a conventional affinity propagation model, the consistent affinity propagation model being constraint by the first predefined condition which is position information for at least two super patches that are in the super patch set and belong to a common three-dimensional model set;

a converting module 702, configured to convert the consistent affinity propagation model into a consistent convergence affinity propagation model; and a generating module 703, configured to cluster the super patch set through the consistent convergence affinity propagation model to generate a co-segmentation outcome for the three-dimensional model set.

Optionally, the obtaining module 701 is particularly configured to construct a factor graph according to the conventional affinity propagation model and the first predefined condition; and obtain the consistent affinity propagation model according to the factor graph, so that a sum of affinity between a super patch and a cluster center thereof is minimized for at least two super patches in each three-dimensional model set, where the super patch set includes at least two cluster centers, and each super patch in the super patch set belongs to the same cluster center.

Optionally, the converting module 702 is particularly configured to pre-establish a second predefined condition and a third predefined condition, the second predefined condition being a first position relation between any two super patches in the super patch set, and the third predefined condition being a second position relation between at least two super patches in the super patch set and belonging to different three-dimensional models; and obtain the consistent convergence affinity propagation model according to the second predefined condition, the third predefined condition and the consistent affinity propagation model, the consistent convergence affinity propagation model being constraint by the second predefined condition and the third predefined condition.

Optionally, the converting module 702 is particularly configured to extract a robust feature vector from a feature vector associated with the super patch set; establish a first association relation between two robust feature vectors that belong to the different three-dimensional models according to a feature descriptor associated with the robust feature vector, the feature descriptor being used for identifying the robust feature vector; establish a second association relation between at least two super patches in the super patch set and belong to different three-dimensional models; and establish the first position relation according to the second association relation.

Figure 8:
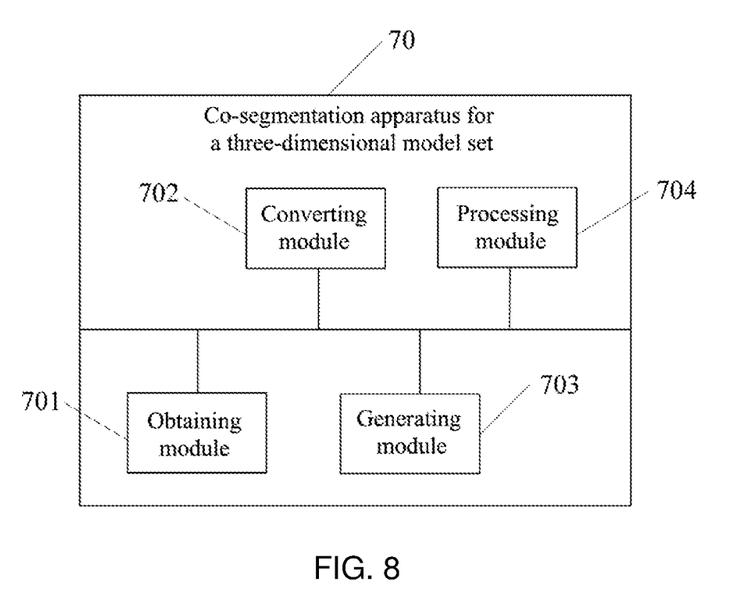
FIG. 8 is a schematic structural diagram illustrating another co-segmentation apparatus for a three-dimensional model set according to a disclosed embodiment.

Optionally, reference is now made to FIG. 8, which is a schematic structural diagram illustrating another co-segmentation apparatus 70 for a three-dimensional model set according to a disclosed embodiment. The three-dimensional model set co-segmentation apparatus 70 may further include a processing module 704 configured to: extract at least seven feature vectors from each super patch in the super patch set; determine a weight for each feature vector in the at least seven feature vectors; and multiplying each feature vector in the at least seven feature vectors with a weight associated with the feature vector, and undergo a normalization process to obtain a unique feature vector associated with each super patch, the unique feature vectors associated with the super patches forming a feature vector set associated with the super patch set.

Optionally, the converting module 702 is particularly configured to obtain the consistent convergence affinity propagation model according to $$S(c_i, c_j) = -\sum_{i \in \pi} s(i, c_i) + \frac{1}{2} \sum_{i \in \pi} \sum_{j \in \pi} \Gamma_{i,j}(c_i, c_j),$$

where $\pi$ represents the super patch set, $S(c_i, c_j)$ represents an optimization outcome for the super patch set based on the consistent convergence affinity propagation model, $s(i, c_i)$ represents an affinity between a super patch i in the super patch set and a cluster center $c_i$ to which the super patch belongs, $\Gamma_{i,j}(c_i, c_j)$ is a constraint item that represents a relation between a super patch i, a super patch j and the cluster center $c_i$, $$\Gamma_{i,j}(c_i, c_j) = \begin{cases} \infty, & \text{if } c_i = j, c_j \neq i \\ \infty, & \text{if } c_j = i, c_j \neq i \\ e^{-s(i,j)}, & j \in N_e(i), c_i \neq c_j \\ 0, & \text{otherwise} \end{cases},$$

$c_j$ represents the cluster center for the super patch j, and $e^{-s(i,j)}$ represents an affinity between the super patch i and the super patch j.

The obtaining module 701 is particularly configured to obtain a consistent affinity propagation model according to:

$$S(x_{11}, \ldots, x_{NN}) = \sum_{i=1}^{N} \sum_{c=1}^{N} S_{ic}(x_{ic}) + \sum_{i}^{N} I_{i=1}(x_{i1}, \ldots, x_{iN}) +$$

-continued $$\sum_{c}^{N} E_{c=1}(x_{1c}, \ldots, x_{N_c}) + \sum_{\{i,k\} \in N_e} \frac{\lambda_{iC}}{2} \sum_{c=1}^{N} P_{ikc}(x_{ic}, x_{kc}).$$

where $S(x_{11}, \ldots, x_{NN})$ represents an energy function for a cluster center of the super patch, $S_{iC}(x_{iC})$ represents an affinity between a super patch i and a potential cluster center c for the super patch, $$S_{ic}(x_{ic}) = \begin{cases} s(i, c), & \text{if } x_{ic} = 1 \\ 0, & \text{otherwise} \end{cases},$$

$x_{ic}=1$ represents the super patch i and the cluster center thereof is c, $I_i(x_{i1}, \ldots, x_{iN})$ represents a N constraint over the cluster center $c_i$ for the super patch i, $$I_i(x_{i1}, \ldots, x_{iN}) = \begin{cases} \infty, & \sum_{c} x_{ic} \neq 1 \\ 0, & \text{otherwise} \end{cases},$$

$E_c(x_{1c}, \ldots, x_{Nc})$ represents a validity constraint over the cluster center C, $$E_c(x_{1c}, \ldots, x_{Nc}) = \begin{cases} \infty, & \text{if } x_{cc} = 0 \text{ and } \sum_{i} x_{ic} \neq 0 \\ 0, & \text{otherwise} \end{cases},$$

and $P_{ikc}(x_{ic}, x_{kc})$ represents a neighborhood consistency constraint, $$P_{ikc}(x_{ic}, x_{kc}) = \begin{cases} 0, & \text{if } x_{ic} = x_{kc} \\ e^{-s(i,c)}, & \text{otherwise} \end{cases}.$$

The three-dimensional model set co-segmentation apparatus 70 shown in the disclosed embodiments is capable of carrying out the technical solution shown in the foregoing method embodiments following similar implementation principals and producing similar advantageous effects, neither of which will be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A co-segmentation method for a three-dimensional model set, comprising:
    obtaining a super patch set for the three-dimensional model set, wherein the three-dimensional model set comprises at least two three-dimensional models, and each of the three-dimensional models comprises at least two super patches;
    obtaining a consistent affinity propagation model according to a first predefined condition and a conventional affinity propagation model, comprising:
    constructing a factor graph according to the conventional affinity propagation model and the first predefined condition; and
    obtaining the consistent affinity propagation model according to the factor graph, so that a sum of affinity between a super patch and a cluster center thereof is minimized for at least two super patches in each three-dimensional model set, wherein the super patch set comprises at least two cluster centers, and each super patch in the super patch set belongs to the same cluster center,
    wherein the consistent affinity propagation model is constraint by the first predefined condition, and the first predefined condition is position information between at least two super patches that are in the super patch set and belong to a common three-dimensional model set;
    converting the consistent affinity propagation model into a consistent convergence affinity propagation model; and
    clustering the super patch set through the consistent convergence affinity propagation model to generate a co-segmentation outcome for the three-dimensional model set.

2. The method according to claim 1, wherein the converting the consistent affinity propagation model into a consistent convergence affinity propagation model comprises:
    pre-establishing a second predefined condition and a third predefined condition, wherein the second predefined condition is a first position relation between any two super patches in the super patch set, and the third predefined condition is a second position relation between at least two super patches that are in the super patch set and belong to different three-dimensional models; and
    obtaining the consistent convergence affinity propagation model according to the second predefined condition, the third predefined condition and the consistent affinity propagation model, wherein the consistent convergence affinity propagation model is constraint by the second predefined condition and the third predefined condition.

3. The method according to claim 2, wherein the pre-establishing a second predefined condition comprises:
    extracting a robust feature vector from a feature vector associated with the super patch set;
    establishing a first association relation between two robust feature vectors that belong to the different three-dimensional models according to a feature descriptor associated with the robust feature vector, wherein the feature descriptor is used for identifying the robust feature vector;
    establishing a second association relation between at least two super patches in the super patch set and belong to different three-dimensional models; and
    establishing the first position relation according to the second association relation.

4. The method according to claim 3, wherein before the extracting a robust feature vector from a feature vector associated with the super patch set, the method further comprises:
    extracting at least seven feature vectors from each super patch in the super patch set;
    determining a weight for each feature vector in the at least seven feature vectors; and
    multiplying each feature vector in the at least seven feature vectors with a weight associated with the feature vector, and undergoing a normalization process to obtain a unique feature vector associated with each super patch, wherein the unique feature vectors associated with the super patches form a feature vector set associated with the super patch set.

5. The method according to claim 2, wherein the obtaining the consistent convergence affinity propagation model according to the second predefined condition, the third predefined condition and the consistent affinity propagation model comprises:
    obtaining the consistent convergence affinity propagation model according to $$S(c_i, c_j) = -\sum_{i \in \pi} s(i, c_i) + \frac{1}{2} \sum_{i \in \pi} \sum_{j \in \pi} \Gamma_{i,j}(c_i, c_j),$$

wherein $\pi$ represents the super patch set, $S(c_i,c_j)$ represents an optimization outcome for the super patch set based on the consistent convergence affinity propagation model, $s(i,c_i)$ represents an affinity between a super patch i in the super patch set and a cluster center $c_i$ to which the super patch belongs, $\Gamma_{i,j}(c_i,c_j)$ is a constraint item that represents a relation between a super patch i, a super patch j and the cluster center $c_i$, $$\Gamma_{i,j}(c_i, c_j) = \begin{cases} \infty, & \text{if } c_i = j, c_j \neq i \\ \infty, & \text{if } c_j = i, c_i \neq i \\ e^{-s(i,j)}, & j \in N_e(i), c_i \neq c_j \\ 0, & \text{otherwise} \end{cases},$$

$c_j$ represents the cluster center for the super patch j, and $e^{-s(i,j)}$ represents an affinity between the super patch i and the super patch j.

6. The method according to claim 1, wherein the obtaining the consistent affinity propagation model according to the factor graph comprises:
    obtaining the consistent affinity propagation model according to $$S(x_{11}, \ldots, x_{NN}) = \sum_{i=1}^{N} \sum_{c=1}^{N} S_{ic}(x_{ic}) + \sum_{i}^{N} I_{i=1}(x_{i1}, \ldots, x_{iN}) + \sum_{c}^{N} E_{c=1}(x_{1c}, \ldots, x_{N_c}) + \sum_{\{i,k\} \in N_e} \frac{\lambda_{iC}}{2} \sum_{c=1}^{N} P_{ikc}(x_{ic}, x_{kc});$$

wherein $S(x_{11}, \ldots, x_{NN})$ represents an energy function for the cluster center of the super patch, $S_{iC}(x_{iC})$ represents an affinity between a super patch i and a potential cluster center c for the super patch, $$S_{ic}(x_{ic}) = \begin{cases} s(i, c), & \text{if } x_{ic} = 1 \\ 0, & \text{otherwise} \end{cases},$$

$x_{ic}=1$ represents the super patch i and the cluster center thereof is c, $I_i(x_{i1}, \ldots, x_{iN})$ represents a N constraint over the cluster center $c_i$ for the super patch i, $$I_i(x_{i1}, \ldots, x_{iN}) = \begin{cases} \infty, & \sum_c x_{ic} \neq 1 \\ 0, & \text{otherwise} \end{cases},$$

$E_c(x_{1c}, \ldots, x_{Nc})$ represents a validity constraint over the cluster center c, $$E_c(x_{1c}, \ldots, x_{Nc}) = \begin{cases} \infty, & \text{if } x_{cc} = 0 \text{ and } \sum_i x_{ic} \neq 0 \\ 0, & \text{otherwise} \end{cases},$$

and $P_{ikc}(x_{ic}, x_{kc})$ represents a neighborhood consistency constraint, $$P_{ikc}(x_{ic}, x_{kc}) = \begin{cases} 0, & \text{if } x_{ic} = x_{kc} \\ e^{-s(i,c)}, & \text{otherwise} \end{cases}.$$

7. A co-segmentation apparatus for a three-dimensional model set, comprising a computer readable storage medium, storing thereon a program which, when being executed, causes a processor to:
obtain a super patch set for the three-dimensional model set, wherein the three-dimensional model set comprises at least two three-dimensional models, and each of the three-dimensional models comprises at least two super patches;
obtain a consistent affinity propagation model according to a first predefined condition and a conventional affinity propagation model, wherein the processor is further configured to:
construct a factor graph according to the conventional affinity propagation model and the first predefined condition; and obtain the consistent affinity propagation model according to the factor graph, so that a sum of affinity between a super patch and a cluster center thereof is minimized for at least two super patches in each three-dimensional model set, wherein the super patch set comprises at least two cluster centers, and each super patch in the super patch set belongs to the same cluster center,
wherein the consistent affinity propagation model is constraint by the first predefined condition, and the first predefined condition is position information between at least two super patches that are in the super patch set and belong to a common three-dimensional model set;
convert the consistent affinity propagation model into a consistent convergence affinity propagation model; and
cluster the super patch set through the consistent convergence affinity propagation model to generate a co-segmentation outcome for the three-dimensional model set.

8. The apparatus according to claim 7, wherein the processor is further configured to:
pre-establish a second predefined condition and a third predefined condition, wherein the second predefined condition is a first position relation between any two super patches in the super patch set, and the third predefined condition is a second position relation between at least two super patches that are in the super patch set and belong to different three-dimensional models; and obtain the consistent convergence affinity propagation model according to the second predefined condition, the third predefined condition and the consistent affinity propagation model, wherein the consistent convergence affinity propagation model is constraint by the second predefined condition and the third predefined condition.

* * * * *